R. H. ROBINSON.
WEEDING HOE.
APPLICATION FILED SEPT. 13, 1915.
1,176,167.
Patented Mar. 21, 1916.
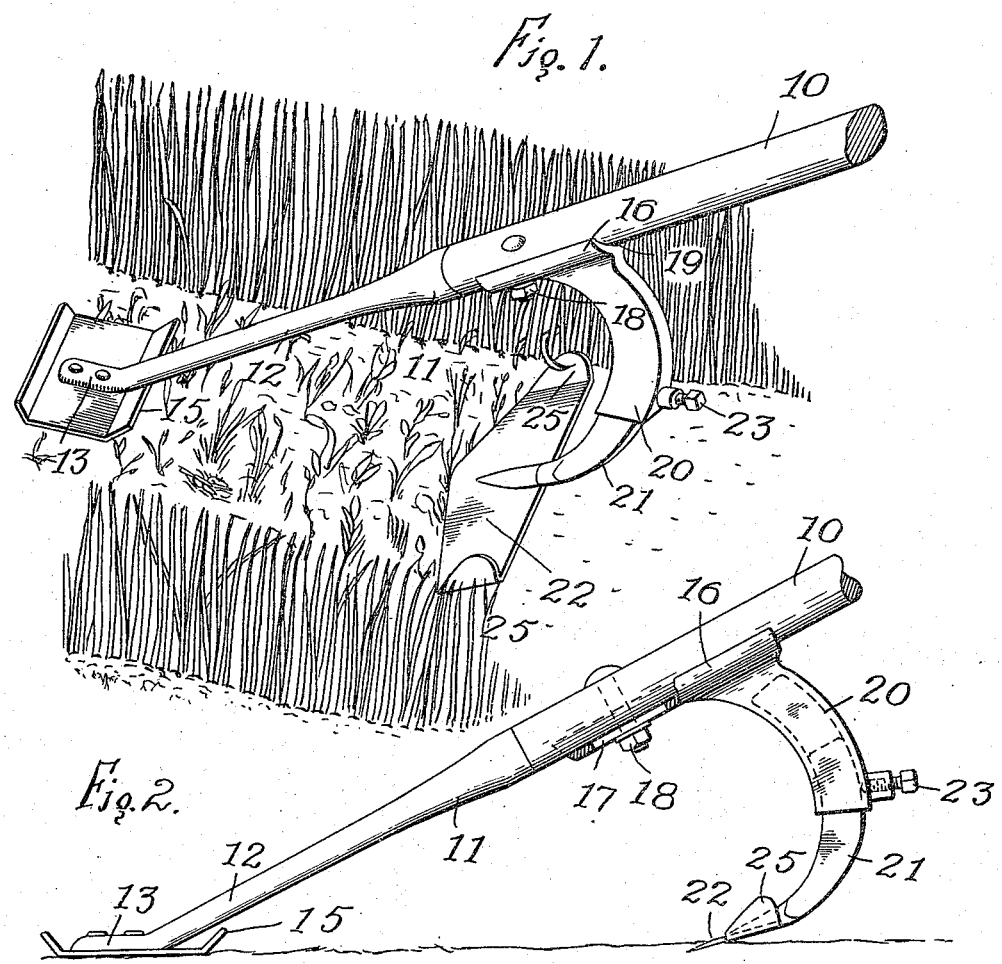
Inventor
R. H. Robinson.
By Attorneys.
Southgate & Southgate.

UNITED STATES PATENT OFFICE.

RAYMOND H. ROBINSON, OF SUNDERLAND, MASSACHUSETTS.

WEEDING-HOE.

1,176,167.  Specification of Letters Patent.  Patented Mar. 21, 1916.

Application filed September 13, 1915. Serial No. 50,323.

*To all whom it may concern:*

Be it known that I, RAYMOND H. ROBINSON, a citizen of the United States, residing at Sunderland, in the county of Franklin and State of Massachusetts, have invented a new and useful Weeding-Hoe, of which the following is a specification.

This invention relates to a push hoe or weeder of the type in which a shoe is used for supporting it and assisting in guiding it. Although suitable for use for weeding many crops it is particularly designed for weeding onions and one of the objects thereof is to provide an arrangement whereby the live onion stalks that may be bent over to the side of the plants will not be cut but will be caused to ride over the blade of the weeder without any attention to them on the part of the operator.

Further objects of the invention are to provide an arrangement in which the blade for cutting the weeds will cut the weeds at a distance from the row first and have a slight tendency to throw the soil toward the row so that at least none of it will be taken from the row; to provide an arrangement whereby the cutting blade can be adjusted in a simple and convenient manner to the proper angle with the ground; and especially to provide an exceedingly simple, strong, durable and inexpensive construction for these purposes.

Reference is to be had to the accompanying drawings, in which—

Figure 1 is a perspective view of a preferred embodiment of the invention; and Fig. 2 is a side elevation showing the manner in which the blade can be adjusted.

The hoe is constructed with a long strong handle 10 which preferably is provided with a metal ferrule 11 at the bottom secured to the handle in the ordinary way but provided at its end with an integral projection 12 to the flattened end 13 of which is secured a supporting shoe or rest 15. This turns up at the front and back but is otherwise flat as is well understood in this art. On the bottom of the handle at a short distance back of the ferrule is secured a metal member 16. This is intended to be securely fixed in position but is provided with a longitudinal slot 17 through which a securing bolt 18 passes so that it can be adjusted longitudinally. The casting or forging of which this member 16 preferably consists is provided with a trough 19 on top fitting the handle and constituting a guide to prevent sidewise motion when secured in position by the single bolt indicated. In this way a firm union of the parts is secured in a very simple manner and yet for adjustment only one nut has to be loosened. This member is provided with a downwardly extending arm 20 which is shown as of general V-shape in cross section having its wide side at the back. This is shown as partaking of the form of an arc of a circle and as provided with a recess in the end thereof also partaking of the same shape. Extending into this recess is a shank 21 of a hoe blade 22. The shank and blade are firmly secured together and the shank is of a triangular cross section like the arm 20 and its recess. It is also curved in the same form so that it can be adjusted in and out of the recess to regulate the angle which the blade at its end will make with the handle and consequently with the ground. A set screw 23 is shown for securing these parts in fixed adjusted position and it will be understood that on account of the long bearing which the shank has in the recess these parts are firmly secured together by this set screw alone.

The cutting or weeding blade 22 is intended to be so located as to make a slight angle with the ground having its front edge at the bottom. The front edge is sharpened off to form a cutting edge and is of a wide V-shape in form, the apex being at the bottom and the legs thereof extending outwardly to the ends of the blade. The blade also is slightly curved from front to rear. At its ends two flanges 25 extend upwardly parallel with each other and with the direction of motion and operation. Their front edges are slanted off so that they will automatically raise any onion stalks they may encounter and force the blade to pass under them without injuring them.

The manner in which the device is used will be obvious. It is simply pushed along the ground with the shoe resting on the surface and the blade cutting into the soil but not very deeply as it is intended mainly as a weeder. By the two adjustments described this blade can be put at the necessary angle to get the desired depth of cut in view of the character of the ground upon which it is being used. It will be noted that it is so arranged that there are not at any place two downwardly extending supports of any kind which could get stones or other materials lodged between them but on the other hand the shank of the blade and supporting arm are beveled off so that anything tending to catch on them must necessarily pass by at one side or the other. Furthermore, by having the blade V-shaped and curved and also locating it slightly at a slant there is a tendency for the earth cut into by it to move away from the center toward the row on which it is being used but this tendency is not great.

It has already been stated that the slanting front edges of the flanges 25 engage the stalks of the onions or any other vegetable on which they are used and force them upwardly so that there is no danger of the hoe cutting them or passing over them or in any way injuring them. At the same time the device is reduced to exceedingly simple terms and is inexpensive to manufacture and extremely strong and durable.

Although I have illustrated and described only a single embodiment of the invention I am aware of the fact that modifications can be made therein by any person skilled in the art without departing from the scope of the invention as expressed in the claims. Therefore I do not wish to be limited to the details of construction herein shown and described, but What I do claim is:—

1. As an article of manufacture, a push hoe comprising a handle, a ferrule on the end of said handle provided with a reduced integral extension in alinement with the handle, a flat supporting shoe fixed on the end of said extension, and a weeding blade carried by the handle centrally below it.

2. As an article of manufacture, a push hoe comprising a handle having a supporting means at the end thereof and provided with a rigid curved arm on the under side of the handle, said curved arm being provided with a similarly curved recess extending up into it from its lower end, a weeding blade provided with a shank having a curve of the same radius as the curve of said recess and extending up into the same, and means for securely holding said shank in adjusted positions in said recess, whereby the angular position of the blade with respect to the handle can be adjusted.

3. As an article of manufacture, a weeding hoe comprising a handle having a supporting means at the end thereof, an arm longitudinally adjustable along said handle and projecting downwardly from the lower side thereof, and a weeding blade carried by said arm and adjustable in the arc of a circle thereon.

4. As an article of manufacture, a weeding hoe comprising a handle having a supporting shoe at the end thereof and provided with a downwardly extending arm at a distance from the shoe, a weeding blade having a supporting shank adjustable along said arm, the shank of said weeding blade being wide at the back and having a comparatively thin edge at the front, the blade being arranged transverse to the edge of said shank.

5. As an article of manufacture, a weeding hoe comprising a handle having a supporting means at the end thereof, and a weeding blade carried by the handle at a distance from the supporting means, said blade being arranged transversely with respect to the handle and having the opposite ends turned up in vertical planes parallel with each other and slanting on top.

In testimony whereof I have hereunto set my hand.

RAYMOND M. ROBINSON.